United States Patent [19]

Reed et al.

[11] Patent Number: 4,966,764
[45] Date of Patent: Oct. 30, 1990

[54] PROCESS FOR PRODUCING LOW ALUMINUM MEMBRANE CELL FEEDBRINE

[75] Inventors: Emily J. Reed, Englewood; David A. Helmstetter, Cleveland, both of Tenn.

[73] Assignee: Olin Corporation, Cheshire, Conn.

[21] Appl. No.: 316,124

[22] Filed: Feb. 24, 1989

[51] Int. Cl.$^5$ .......................... C01D 3/00; C01D 3/16
[52] U.S. Cl. .................................... 423/499; 210/726; 210/754
[58] Field of Search ................ 423/499; 210/710, 724, 210/726, 754

[56] References Cited

U.S. PATENT DOCUMENTS 2,764,472  9/1956  Cady et al. .......................... 423/499
2,982,608  5/1961  Clement .............................. 423/499
3,798,160  3/1974  Huffman ............................ 210/710
4,155,819  5/1979  Carlin ................................ 210/754
4,336,232  6/1982  Moritz ............................... 210/726

Primary Examiner—Jeffrey E. Russel
Assistant Examiner—Stephen G. Kalinchak
Attorney, Agent, or Firm—Ralph D'Alessandro

[57] ABSTRACT

A process for controlling the concentration of aluminum in the brine of a membrane chlor-alkali cell is disclosed wherein the brine has its calcium carbonate settler solids digested in the calcium chloride flow stream by the addition of an inorganic mineral acid to bring the pH to about 2.0 to about 3.0 to solubilize the aluminum in the brine. The brine has the pH adjusted upwardly to reprecipitate the aluminum onto carrier particles and then removes the reprecipitated aluminum and carrier particles from the brine by filtration or centrifugation.

15 Claims, 2 Drawing Sheets

MEMBRANE CELL BRINE SYSTEM

PROCESS FOR PRODUCING LOW ALUMINUM MEMBRANE CELL FEEDBRINE

BACKGROUND OF THE INVENTION

This invention relates generally to a process for controlling aluminum concentrations in membrane chlor-alkali cell brine. More specifically, this invention relates to the system by which aluminum is removed from the brine by concentrating it in the calcium chloride production system.

In a membrane cell chlor-alkali plant the membrane usable life is directly related to the quality of the brine employed in the membrane cells. These brines are typically alkali metal halide brines that are concentrated solutions which are prepared by dissolving the alkali metal halide in water or a less concentrated aqueous brine solution. However, this preparation naturally produces impurities in the brine that must be strictly controlled in order to guarantee membrane life. The impurities can vary in both types and concentration depending on the source of the alkali metal halide or salt. Typical brine solutions contain significant concentrations of calcium, magnesium, iron, and silica as impurities. Lower concentrations of complex-forming elements such as aluminum, zinc, tin, and lead are also present. Aluminum has been determined to be an extremely harmful impurity affecting membrane life. The normal aluminum concentration limit established by membrane manufacturers for brine is 60 parts per billion (ppb) in the feed brine.

Other sources of aluminum contamination, besides the alkali metal halide salt, include the make-up calcium chloride, the make-up water, soda ash, the primary filter media, the filter aid, hydrochloric acid, and sodium hydroxide. These are all present as components at various stages in the chlor-alkali production cycle. Minimizing the amount of aluminum contaminant that enters the brine system as feed is critical to controlling the overall aluminum contaminant concentration in the brine system. This is especially significant since once aluminum enters the brine system and becomes soluble, it is extremely difficult to remove from the solution. A number of different processes have been used to attempt to control the aluminum concentration in alkali metal brines. One process is described in U.S. Pat. No. 4,450,057, issued May 22, 1984 to P. P. Kelly. This reference discloses the acidification of concentrated alkali metal halide brine to a pH of between 2.0 and 3.0 to convert the aluminum present to the soluble $A^{+3}$ form. The acidic brine is in contact with a strong macroreticular cationic chelating resin to remove the dissolved aluminum ions at negative hydroxyl sites on the resin. In this process, hydrogen ions from the acid compete with the aluminum ions for the negative hydroxyl sites on the resin. The neutralization of these hydroxyl sites with hydrogen ions makes the resin less effective for aluminum ion removal and requires frequent regeneration of the resin and significant additional costs.

Alternate processes which stabilize aluminum as solid particles of an aluminum-silica complex are described in U.S. Pat. Nos. 4,515,665 and 4,618,403 issued to D. L. Fair et al. In these references, the brine is maintained at a pH in the range of 4–12 to prevent aluminum from dissolving. The solid particles of the aluminum complex are removed from the spent brine by suitable processes, such as filtration.

However, these prior processes do not address the gradual increase in the concentration of aluminum that occurs within the brine that eventually requires a treatment for removal to avoid an aluminum storehouse effect caused by layers of quickly dissolving aluminum attaching to insoluble particles present in the brine system.

These problems are solved in the process of the present invention which removes aluminum from an alkali metal halide brine in a closed-loop membrane cell chlor-alkali brine system in the calcium chloride feed stream.

SUMMARY OF THE INVENTION

It is an object of the present invention to provide a process for the removal of aluminum from alkali metal halide brine in a closed-loop membrane cell chlor-alkali brine system.

It is another object of the present invention to utilize the calcium chloride feed stream flowing from the calcium carbonate settler into the calcium sulfate crystallizer.

It is a feature of the present invention that the pH of the calcium chloride feed stream is lowered in the calcium carbonate digester to solubilize the aluminum and then, by raising the pH, to reprecipitate the aluminum onto carrier surfaces and then remove them by filtering or centrifuging the calcium chloride stream.

It is an advantage of this system that aluminum entering the brine system is minimized and that aluminum levels in the alkali metal halide brine are kept at acceptable concentrations.

These and other objects, features and advantages are obtained in an alkali metal halide brine system wherein aluminum is removed in the calcium chloride feed stream by recycling brine from the calcium carbonate settler and digesting the solids recycled from the calcium carbonate settler at a lower pH to solubilize the aluminum, followed by a raising of the pH to reprecipitate the aluminum onto carrier particles to facilitate easier removal. The calcium carbonate settler solids and the calcium sulfate serve as surfaces upon which the aluminum may deposit and the pH adjustment serves as the driving force to remove the aluminum from solution.

BRIEF DESCRIPTION OF THE DRAWINGS

The preceding objects, features and advantages of the present invention will become apparent upon consideration of the following detailed disclosure of the invention, especially when it is taken in conjunction with the accompanying drawings wherein.

DETAILED DESCRIPTION OF THE PREFERRED EMBODIMENT

The following is a detailed description of the preferred or alternative embodiments of the brine system employing the aluminum removal process of the present invention.

Concentrated alkali metal halide brines treated by the instant process of this invention include aqueous solutions of halides of the elements of Group I of the periodic table, and particularly sodium, potassium, and lithium. For commercial reasons, sodium and potassium are the preferred alkali metals. The term halide is intended to include chloride and bromide brines.

Chloride brines are the preferred. It is desired to have brines containing aluminum concentrations of about 60 parts per billion or less after treatment. Typical sodium chloride brines contain from about from 100 to about 2500 parts per billion of aluminum. It is theorized that aluminum goes from the acidic side in the anolyte through the membrane to the alkaline side in the catholyte by forming aluminum complexes with silica hydroxide chains.

In the above 60 parts per billion concentration, the aluminum complexes break the ion exchange membrane polymer chains down at transfer sites. The membrane can then no longer pass sodium ions to the catholyte chamber. Caustic then migrates back through the membrane into the anolyte because of anolyte to catholyte side transport. This totally breaks down the efficient operation of membrane chlor-alkali cells, as well as doing the aforementioned permanent damage to the membranes by breaking down the ion exchange polymer chains.

Figure 1:
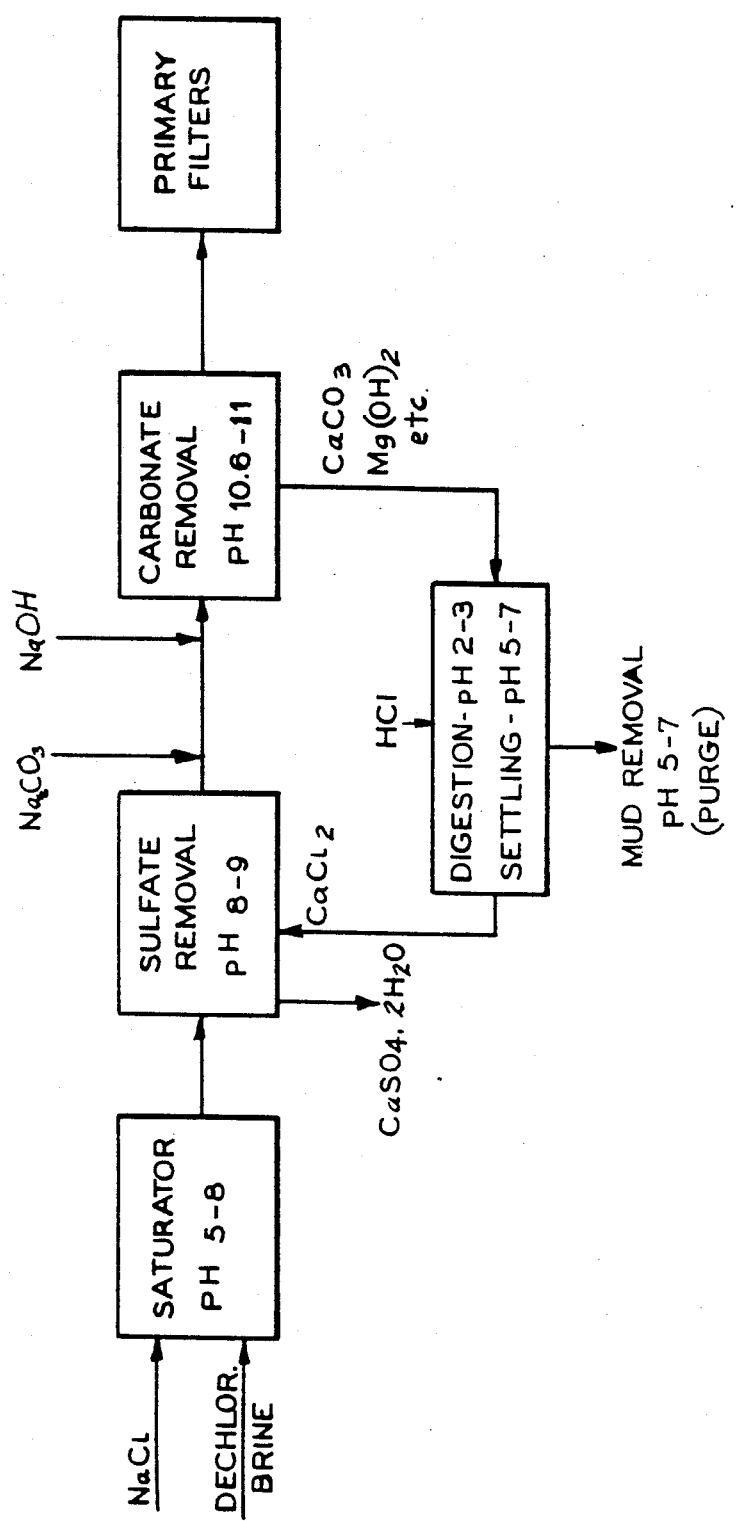
FIG. 1 is a diagrammatic illustration of a membrane cell brine system wherein the calcium carbonate settler bottoms or solids are first digested with an acid and then are given a pH adjustment to remove the solids by settling or through purging.
Figure 2:
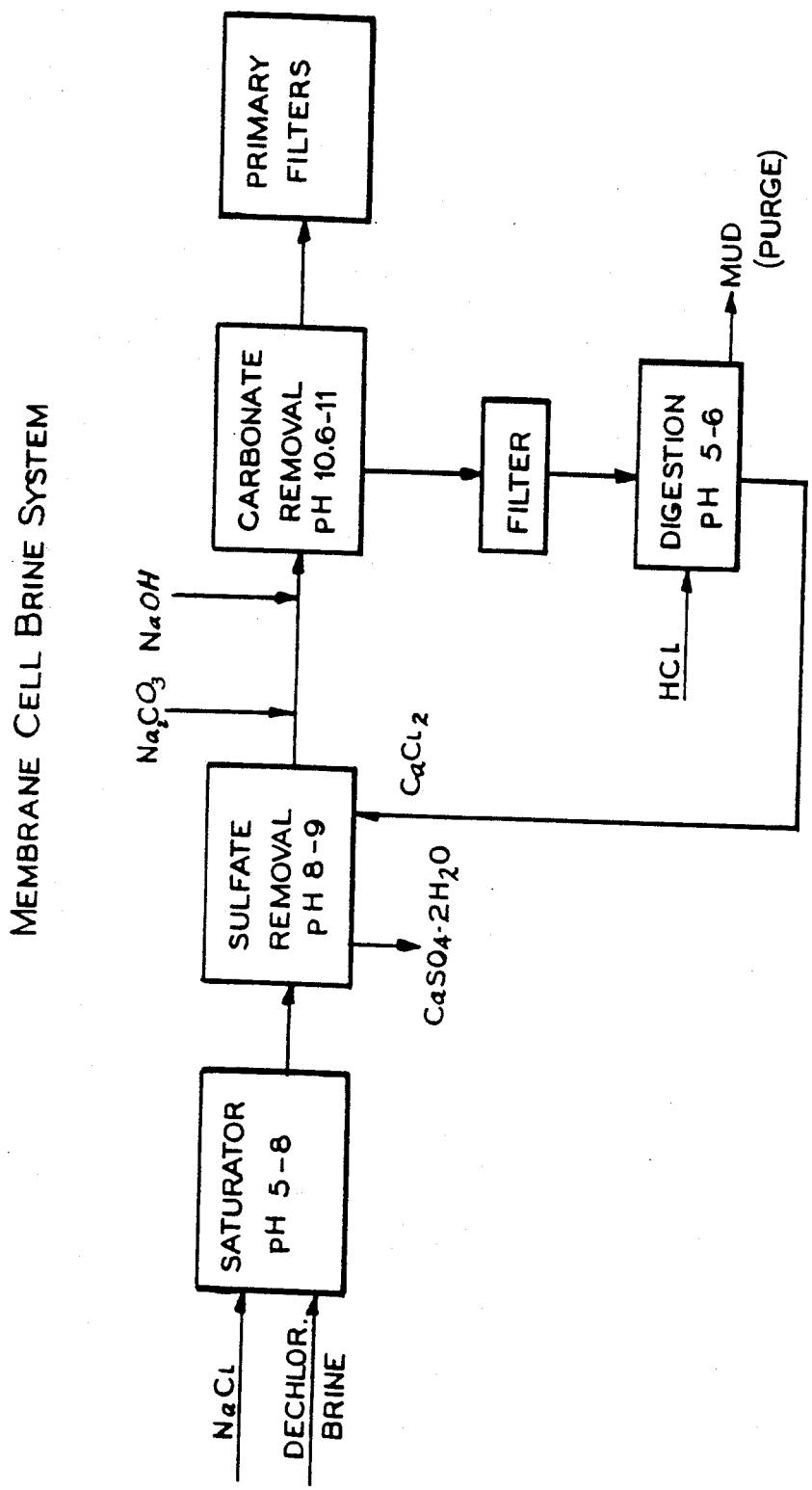
FIG. 2 is a diagrammatic illustration of a membrane cell brine system wherein the calcium carbonate settler bottoms are first filtered, then digested and pH adjusted to between 5–7.

The preferred sodium chloride brine is resaturated with NaCl in a saturator and at a pH of between about 5 and about 8. This is best seen in FIGS. 1 and 2. Sulfate is next removed in a sulfate crystallizer in the form of hydrated calcium sulfate, with the pH being adjusted to be between about 8 and about 9. Subsequently, sodium carbonate and sodium hydroxide are added to the brine to substantially reduce the concentration of alkaline earth metals, such as calcium and magnesium, as well as heavy metals, such as iron. This occurs in the carbonate removal step.

At this state of the brine treatment system, the pH of the brine is above 10, for example, in the range of about 10.5 to about 11.5. Filtering subsequently occurs to the brine through the use of primary filtering devices.

At the site of the carbonate removal via the calcium carbonate settler, the precipitated alkaline earth metals, such as calcium and magnesium, along with the other settler bottoms, can be processed in one of two ways as a part of supplying the calcium chloride feed stream back into the sulfate crystallizer. Both methods pinpoint the location of the aluminum removal by providing an aluminum carrying surface and a driving force in the form of a narrow band of pH adjustment to effect removal of the aluminum carrying particles in the calcium chloride feed stream. This feed stream is produced by recycling and digesting the calcium carbonate settler solids previously referred to, thereby allowing the aluminum to build to extremely high levels in this flow loop.

FIG. 1 gives the variation wherein all of the calcium carbonate settler bottoms or solids are digested by the addition of an inorganic mineral acid, such as hydrochloric acid to reduce the pH to about 3. This dissolves or solubilizes the aluminum. The pH is then adjusted to between about 5.0 and about 8.0, and preferably about 5.0 and about 7.0, by adding sodium hydroxide to form aluminum hydroxide complexes which precipitate out and are removed via mud removal, or purging by a settling tank, or centrifuge. This pH adjustment causes the solubilized aluminum to become a gel which is then easily attachable to other insoluble materials.

An alternative variation is shown in FIG. 2, the calcium carbonate settler bottoms or solids are filtered first and then followed by digestion of the solids at a pH of about 2.0 to about 3.0 by the addition of the appropriate inorganic mineral acid. The pH is then subsequently adjusted by the addition of sodium hydroxide to about 5.0 to about 7.5, and more preferably between about 5.5 and 7.5. A purging of the aluminum hydroxide complex occurs by either filtration or centrifugation of the calcium chloride feed stream.

The instant process for the removal of aluminum from alkali metal halide brines is particularly suitable for electrolysis occurring in membrane cells at high current densities where the presence of aluminum and other cation impurities is more detrimental to the efficient operation of the cell.

Using the novel aluminum removal process of the present invention, high purity alkali metal halide brines may be produced for use in electrolytic membrane cells which have concentrations of aluminum reduced to a level that will not cause damage to a cation exchange membrane or affect the membrane's ability to transport cations or water molecules.

To further illustrate the novel process of the present invention, the following example is presented:

EXAMPLE

A concentrated sodium chloride brine containing between about 295 and about 305 grams per liter of NaCl at a temperature of between about 55-60 degrees Celsius was formed by resaturation of the dechlorinated brine coming from a membrane cell with NaCl at a pH of between 5 and about 8. The resaturated brine was passed through a sulfate crystalizer to remove hydrated calcium sulfate. The resulting brine had a pH of between about 8 and about 9. Concentrated brine was treated with sodium carbonate and sodium hydroxide and fed to a carbonate settler. The calcium carbonate settler bottoms were then filtered to separate the solids and the solids were digested at a pH of about 2 to about 3. The calcium chloride feed stream was then pH adjusted, by the addition of sodium hydroxide, to about 5.5 to about 7.5, and filtration or centrifugation of the stream occurred to remove the solids. Analysis of the brine after the re-entry of the calcium chloride feed stream from the carbonate removal site seen in FIGS. 1 and 2 resulted in aluminum concentrations uniformly being beneath 60 parts per billion for the 45 days analyzed, as seen in Table I under the "After Settler" column. The aluminum concentrations listed under the "After Saturator" column correspond to samplings taken subsequent to the saturator site seen in FIGS. 1 and 2.

| | DAILY BRINE ANALYSIS | | | | | | | | | |
|---|---|---|---|---|---|---|---|---|---|---|
| | AFTER SETTLER (daily) | | | | | AFTER SATURATOR (daily) | | | | |
| DOL | Ca ppb | Al ppb | Mg ppb | Si ppb | Sr ppb | Ca ppm | Al ppb | Mg ppb | Si ppb | Sr ppb |
| 136 | 15467 | 30 | 247 | 3188 | 149 | 443 | 844 | 2723 | 5339 | 2286 |
| 137 | 7541 | 34 | 795 | 3129 | 65 | 400 | 283 | 3564 | 3045 | 2138 |
| 138 | 8675 | 8 | 660 | 3727 | 75 | 327 | 822 | 3443 | 8187 | 2223 |
| 139 | 11544 | −2 | 462 | 3366 | 57 | 482 | 1028 | | | |
| 140 | 4272 | 11 | 489 | 1903 | 29 | 546 | 1419 | 2500 | 2171 | 2691 |
| 141 | 25979 | 18 | 943 | 4085 | 203 | 572 | 105 | 900 | 7011 | 2698 |
| 142 | 8475 | 10 | 545 | 3696 | 76 | 471 | 130 | 940 | 5465 | 2654 |
| 143 | | | | | | | | | | |
| 144 | | | | | | | | | | |
| 145 | 4176 | 16 | 834 | 32132 | 44 | 616 | 860 | 1711 | 7510 | 3464 |
| 146 | 20106 | 12 | 850 | 8999 | 243 | 556 | 1317 | 4026 | 14989 | 3318 |
| 147 | 31213 | 11 | 1169 | 8143 | 450 | 544 | 1017 | 4943 | 24985 | 4176 |
| 148 | 44831 | 11 | 1503 | 5718 | 605 | 575 | 311 | 1096 | 9748 | 3304 |
| 149 | 47017 | 11 | 2138 | 3051 | 1109 | 576 | 538 | | | |
| 150 | 41323 | 9 | 1252 | 1796 | 542 | | | | | |
| 151 | 23115 | 8 | 1321 | 3056 | 348 | | | | | |
| 152 | 25477 | 8 | 1432 | 3126 | 409 | | | | | |
| 153 | 28807 | 14 | 1350 | 5604 | 397 | | | | | |
| 154 | 28848 | 6 | 1223 | 4516 | 440 | | | | | |
| 155 | 36677 | 7 | 1055 | 7627 | 333 | 237 | | 550 | 129801 | 1247 |
| 156 | 59172 | 12 | 1551 | 37502 | 397 | 247 | 444 | 31993 | 231768 | 33419 |
| 157 | 31089 | 9 | 1175 | 10788 | 233 | 338 | 356 | 974 | 88734 | 908 |
| 158 | 30354 | 7 | 1395 | 6519 | 263 | 365 | 157 | 393 | 83746 | 810 |
| 159 | 19515 | 9 | 1451 | 4542 | 241 | 280 | 176 | 2285 | 30255 | 1694 |
| 160 | 13660 | 8 | 1144 | 4247 | 160 | 426 | 203 | 5244 | 49433 | 1770 |
| 161 | 31268 | 8 | 1037 | 5923 | 735 | 421 | 195 | 4974 | 87765 | 2077 |
| 162 | 21164 | 27 | 303 | 3060 | 155 | 446 | 154 | 1518 | | 2804 |
| 163 | 12857 | 19 | 274 | 4602 | 125 | 429 | 182 | 3151 | 39415 | 2368 |
| 164 | 23862 | 21 | 663 | 6284 | 331 | 523 | 209 | 8157 | 60648 | 3098 |
| 165 | 11193 | 15 | 856 | 3606 | 133 | 517 | 134 | 1668 | | 2130 |
| 166 | 17503 | 12 | 1299 | 3543 | 217 | 460 | 116 | 1924 | 7512 | 2921 |
| 167 | 25709 | 35 | 727 | 4446 | 317 | 451 | 170 | 15309 | 5563 | 3817 |
| 168 | 13813 | 43 | 456 | 4746 | 136 | 386 | 183 | 3186 | 4854 | 2825 |
| 169 | 30231 | 15 | 1304 | 5156 | 325 | 389 | 134 | 11927 | 34911 | 2526 |
| 170 | 18745 | 15 | 797 | 5308 | 287 | 357 | 146 | 2125 | 47267 | 2530 |
| 171 | 13261 | 11 | 1078 | 3705 | 222 | 362 | 154 | 3938 | | 2723 |
| 172 | 15405 | 13 | 998 | 4041 | 171 | 460 | 144 | 3736 | | 2917 |
| 173 | 8352 | 21 | 831 | 5304 | 148 | 437 | 198 | 2479 | 49314 | 3250 |
| 174 | 8329 | 33 | 714 | 8896 | 154 | 375 | 208 | 3301 | 27873 | 2935 |
| 175 | 13506 | 28 | 747 | 5568 | 173 | 367 | 216 | 2058 | 47351 | 2651 |
| 176 | 16994 | 10 | 402 | 3660 | 174 | 365 | 202 | 1428 | 31152 | 2900 |
| 177 | 29528 | 26 | 546 | 4026 | 288 | 361 | 133 | 6285 | 49247 | 6697 |
| 178 | 33634 | 6 | 894 | 5259 | 359 | 388 | 159 | 3108 | 34937 | 2627 |
| 179 | 28223 | 6 | 905 | 4931 | 299 | 375 | 203 | 5355 | 24965 | 2909 |
| 180 | 27278 | 21 | 957 | 4375 | 271 | 375 | 170 | 1971 | 44509 | 2608 |

NOTE:
NEGATIVE INDICATES LESS THAN (BELOW DETECTION LIMIT)

While a preferred process in which the principles of the present invention have been incorporated is shown and described above, it is to be understood that the invention is not to be limited to the particular details thus presented, but, in fact, widely different means and steps may be employed in the practice of the broader aspects of this invention. The scope of the appended claims is intended to encompass all obvious changes in details, materials, and arrangement of parts which will occur to one of skill in the art upon the reading of this disclosure.

What is claimed is:

1. A process for purifying a dehalogenated alkali metal halide brine containing aluminum as an impurity in a brine system originally supplying saturated brine for an electrolytic cell, the process comprising the steps of:
    (a) resaturating the dehalogenated brine;
    (b) removing sulfate;
    (c) removing carbonate;
    (d) creating a calcium chloride feed stream from the carbonate removal site to feed to the sulfate removal site by digesting recycled calcium carbonate settler solids at a pH of about 2.0 to about 3.0 by the addition of an inorganic mineral acid into the solids removed from the calcium carbonate settler to form the calcium chloride feed stream and to solubilize the aluminum, raising the pH of the calcium carbonate settler solids in the calcium chloride feed stream to precipitate aluminum onto undigested carrier particles from the calcium carbonate settler solids; and
    (e) removing the precipitated aluminum and the undigested carrier particles from the calcium chloride feed stream.

2. The process, according to claim 1, in which the alkali metal is sodium or potassium.

3. The process of claim 2 in which the halide is chloride or bromide.

4. The process of claim 3 in which the inorganic mineral acid is hydrochloric acid.

5. The process according to claim 4 wherein the pH is raised by the addition of sodium hydroxide to precipitate the aluminum onto carrier particles.

6. The process according to claim 5 in which the precipitate aluminum and the carrier particles are removed by filtration from the calcium chloride feed stream.

7. The process according to claim 5 in which the precipitate aluminum and the carrier particles are removed by centrifugation from the calcium chloride feed stream.

8. The process according to claim 4 wherein the calcium carbonate settler solids are filtered prior to digestion.

9. In a process for purifying a dehalogenated alkali metal halide brine containing aluminum as an impurity in a brine system originally supplying saturated brine for an electrolytic cell employing the steps of brine resaturation, sulfate removal via a calcium sulfate crystallizer, and carbonate removal via a calcium carbonate settler, the improvement comprising in combination:
  (a) feeding a calcium chloride stream to the sulfate removal site;
  (b) digesting calcium carbonate settler solids recycled from the calcium carbonate settler at a pH of about 2.0 to about 3.0 by adding an inorganic mineral acid into the recycled solids removed from the calcium carbonate settler to form the calcium chloride stream and to solubilize the aluminum and then raising the pH of the calcium carbonate settler solids to precipitate aluminum onto undigested carrier particles in the calcium carbonate settler solids; and
  (c) removing precipitated aluminum and the undigested carrier particles for the calcium chloride stream.

10. The process according to claim 9 in which the alkali metal is sodium or potassium.

11. The process according to claim 9 in which the halide is chloride or bromide.

12. The process according to claim 10 in which the inorganic mineral acid is hydrochloric acid.

13. The process according to claim 12 wherein the pH is raised by the addition of sodium hydroxide to precipitate the aluminum onto carrier particles.

14. The process according to claim 13 in which the precipitated aluminum and the carrier particles are removed by filtration from the calcium chloride stream.

15. The process according to claim 13 in which the precipitated aluminum and the carrier particles are removed by centrifugation from eh calcium chloride stream.

* * * * *